March 22, 1932. W. J. COULTAS 1,850,384
HAYRAKE
Filed Feb. 23, 1929
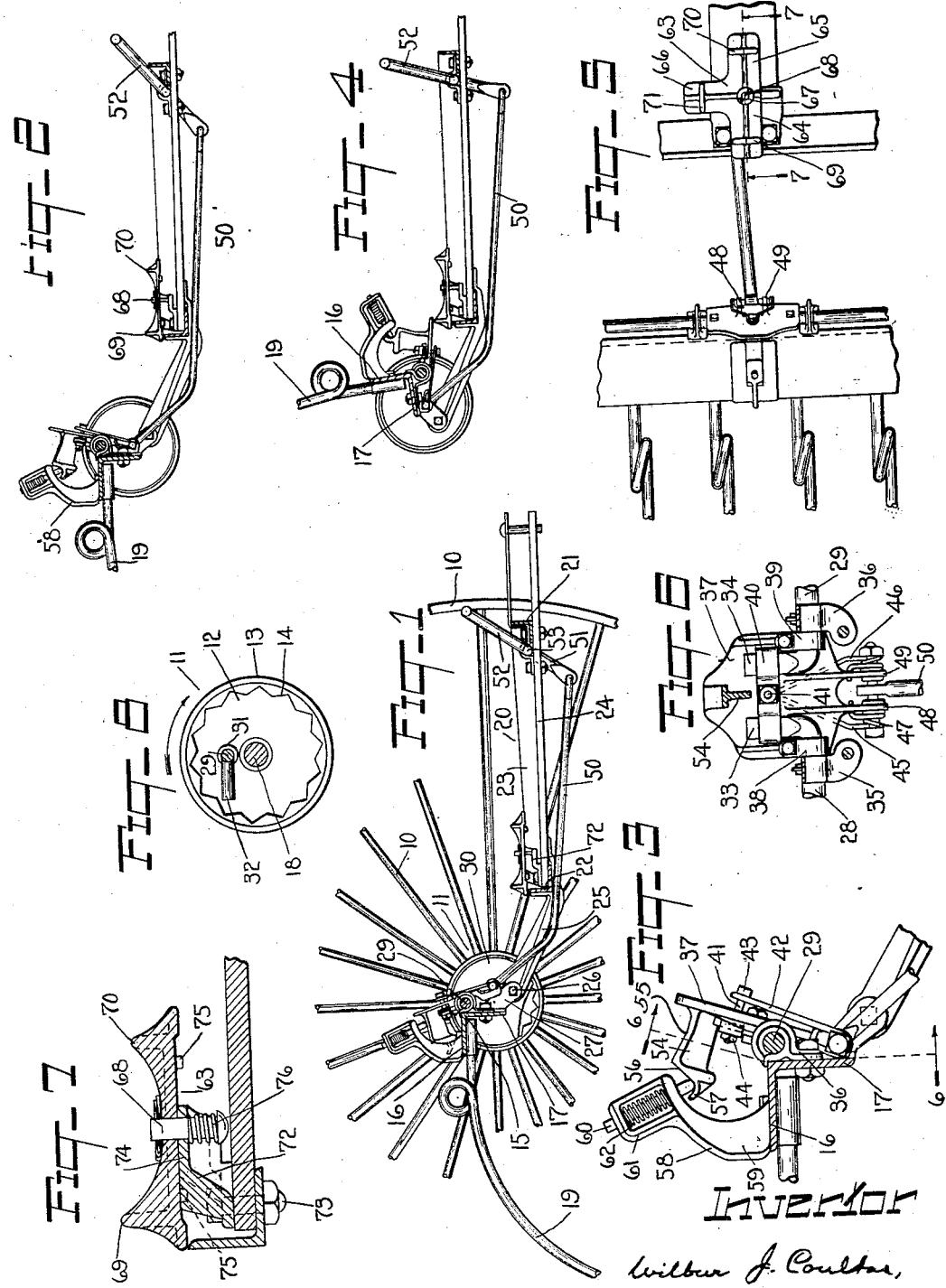

Patented Mar. 22, 1932

1,850,384

UNITED STATES PATENT OFFICE

WILBUR J. COULTAS, OF MOLINE, ILLINOIS, ASSIGNOR TO DEERE & COMPANY, OF MOLINE, ILLINOIS, A CORPORATION OF ILLINOIS

HAYRAKE

Application filed February 23, 1929. Serial No. 341,995.

This invention relates to what are generally known as self dumping hay rakes, or rakes in which the rake head is swung upward to dump its load of gathered hay by forward rotation of one or both of its supporting wheels. The dumping mechanism, which comprises dogs connected with the rake head and movable into engagement with the teeth of ratchet wheels carried by and rotating with the carrying wheels, is normally inoperative and is thrown into operation at the option of the operator. When the rake head has been swung upward to the limit of its dumping movement the dumping mechanism is automatically disconnected and the rake head thereupon returns by gravity to its operative position. Rake heads having these general characteristics are well known in the art, and the invention which constitutes the subject-matter of this application is in the nature of certain improvements by which certain objectionable features of the constructions heretofore employed are avoided, and new and advantageous features are introduced.

One of the objects of my invention is to provide improved tripping mechanism by which the rake head is released from the carrying wheels after the dumping has been accomplished, by which the operating parts are cushioned in the tripping operation so that danger of breakage or disarrangement of parts is avoided, and the actuation of the dumping mechanism by the operator is made easier; also, in connection with tripping mechanism having such cushioning means, to provide an arrangement by which either carrying wheel separately will be effective to carry out the dumping operation, so that the load may be dumped while the rake is turning as well as when it is traveling straight ahead.

Another object of the invention is to provide means by which the height to which the rake head is swung in dumping may be varied to meet the requirements of raking different kinds of hay. A rake of this type rakes the hay into windrows, and it is, of course, necessary that in the dumping operation the rake teeth clear the windrow so that the raked hay will not be scattered as the machine progresses. Usually, the weight of the load of raked hay determines the time for dumping, and with heavy hay the windrows are lower and more compact than where the hay is light. Moreover, light hay expands in dumping, and so increases the bulk of the windrow. Furthermore, after dumping the rake head should at once drop back to its raking position, since as the machine is traveling during the dumping operation, unless the rake head immediately returns to such position there will be more or less space that will not be raked. In view of these considerations it is important that the rake head be swung no higher in dumping than is necessary to enable the points of the teeth to clear the windrow, and to that end it is desirable that provision be made for regulating the extent to which the rake head is swung in dumping, in accordance with the condition of the hay that is being raked.

In addition to the foregoing principal objects my invention also aims to provide certain improvements in construction which will be pointed out hereinafter.

I accomplish these objects as illustrated in the drawings and hereinafter described. What I regard as new is set forth in the claims.

In the accompanying drawings,—

Fig. 1 is a fragmentary view, being a partial longitudinal vertical section taken through the rake head and draft frame at a point a little to one side of the center of the machine, showing the rake head in its normal or operating position;

Fig. 2 is a similar view showing the position of the parts at the beginning of the dumping operation, that is to say just after the operator has connected the rake head with one or both of the carrying wheels;

Fig. 3 is an enlarged view of the dumping mechanism, showing it in the same position as that illustrated in Fig. 2;

Fig. 4 is a view similar to Fig. 2, showing the parts in the position they assume just before the tripping mechanism functions to release the rake head and permit it to return to its operating position;

Fig. 5 is a partial plan view showing the central portion of the rake head, the tripping mechanism and the means for controlling the extent to which the rake head is swung in dumping;

Fig. 6 is a sectional detail taken on line 6—6 of Fig. 3;

Fig. 7 is an enlarged longitudinal vertical section on line 7—7 of Fig. 5 showing the means for regulating the extent to which the rake head is swung in dumping; and Fig. 8 is a view showing the ratchet wheel and dog by which the rake head is connected with one or both of the carrying wheels to accomplish the dumping of the load.

Referring to the drawings,—10 indicates one of the carrying wheels and 11 a ratchet wheel that may be secured to or formed integral with the hub thereof. As usual, the ratchet wheel 11, one of which is carried by each carrying wheel, preferably comprises a radial portion 12 having an inwardly projecting marginal flange 13 provided with internal ratchet teeth 14. It will be understood that these ratchet wheels turn with the carrying wheels to which they are affixed.

The rake head is of conventional design, and preferably comprises a beam 15 that extends from one of the carrying wheels to the other, this beam being in the form of an angle iron having a horizontal flange 16 and a vertical flange 17. Secured to each end portion of the vertical flange 17 is a stub axle 18, upon which stub axles the carrying wheels 10 are journaled in the usual way. These stub axles are offset a short distance beyond the front face of the vertical flange 17 so that when the rake head is in its operating position said flange lies somewhat back of the axial line of the axles 18, and consequently the rake head may be swung upward and forward from its operating position about the axles 18 as pivotal supports. The rake head carries the usual rake teeth 19 which are secured to its horizontal flange 16 and extend rearwardly therefrom. A draft frame 20, preferably comprising front and rear transverse bars 21, 22, longitudinal side bars 23 and an intermediate bar 24 secured together to form a rigid structure, extends forward from the rake head in a horizontal plane somewhat below the axis of the carrying wheels, as shown in Fig. 1, and is pivotally connected with the rake head by rearwardly projecting brackets 25 that are secured to the rear portion of the draft frame at convenient intervals, preferably four of such brackets being provided.

The rear ends of these brackets are connected by pivots 26 with lugs 27 that project downward and forward from the vertical flange 17 of the rake head, as shown. When the rake head is actuated, either to dump it or return it to its operating position, it swings about the axial line of the stub axles 18, which turn in the carrying wheel bearings, the wheels, of course, rotating on such stub axles. The rake head may, therefore, be swung from the position shown in Fig. 1, where its horizontal flange 16 is in its normal position, to a point slightly beyond the position shown in Fig. 4, where its horizontal flange 16 assumes an approximately vertical position. In this operation the brackets 27 are swung backward and upward, lifting the rear portion of the draft frame, which carries the driver's seat, so that his weight tends not only to check the upward movement of the rake head as it is released from the load and so becomes lighter, but also to move the rake teeth back to operating position after dumping has been accomplished.

Pivotally mounted on the rake head eccentrically with reference to the stub axles 18 are two rock shafts 28, 29, each of which is approximately half as long as the rake head. These rock shafts are alined with each other and extend in opposite directions from about the center of the rake head to the ratchet wheels 11, their outer ends being journaled in plates or discs 30 on the end portions of the stub axles 18 in position to extend over the inner faces of said ratchet wheels. These plates, which are secured on the stub axles 18 and normally do not turn with the ratchet wheels with which they are associated, are provided with bearings 31 that receive and pivotally support the outer end portions of the rock shafts 28, 29 respectively, as best shown in Fig. 8. At their outer ends the rock shafts 28, 29 are bent at right angles to form, or are otherwise provided with, short arms 32 that underlie the ratchet teeth 14 and are adapted to function as dogs to engage said ratchet teeth so that the rock shafts, and with them the rake head, may be caused to turn with the ratchet wheels 11 about the axes of the carrying wheels.

In the arrangement shown rocking the rock shafts 28, 29 in a clockwise direction moves the dogs 32 into engagement with the ratchet teeth 14 and causes the rake head to swing in the same direction, as indicated by the arrow in Fig. 8.

The inner ends of the rock shafts 28, 29 are also bent at right angles to form arms 33, 34 that are parallel with each other and lie at opposite sides of and adjacent to the center of the rake head, as best shown in Fig. 6. The inner end portions of the rock shafts 28, 29 are preferably secured to the rake head by bearing brackets 35, 36, as shown in Fig. 6, and are also pivotally connected with the opposite marginal portions of a trip plate 37 by clips 38, 39, as best shown in said figure. The arms 33, 34 of said rock shafts extend over the rear surface of said plate and are normally held in contact therewith by a transverse bar 40 that extends across the plate 37 and bears on the rearward surfaces of the arms 33, 34, which are preferably flattened, as shown in Fig. 6. The bar 40 is centrally mounted on a bolt 41 that extends through the plate 37, as shown in Fig. 3, and carries the upper end of a hairpin spring 42 that tends to thrust forwardly against the head 43 of said bolt. Preferably, the bolt is arranged with its head at the front and provided with a nut 44 at the rear, but, of course, this arrangement could be reversed if desired. By means of the nut 44 the tension of the spring 42 may be adjusted, as will be apparent. The spring 42 has downwardly diverging arms 45, 46, the ends of which are wrapped around the end portions of a transverse bolt 47 and are then seated on downwardly projecting arms 48, 49 carried by the plate 37, as best shown in Fig. 6.

The bolt 47 extends through these arms and midway between them is connected with an operating rod 50 that extends forward under the draft frame and is connected at its forward end with the lower arm 51 of a foot lever 52 that is pivotally mounted at the forward portion of the draft frame, as shown at 53 in Fig. 1, and extends forward and upward into convenient position to be actuated by the operator.

From the foregoing description it will be understood that by pressing the foot lever 52 forward the rod 50 will be moved rearwardly and will consequently swing the plate 37 in a clockwise direction as viewed in Fig. 3. Through the spring 42 and cross-bar 40 this movement will be transmitted to the arms 33, 34 of the rock shafts 28, 29, thereby rocking said rock shafts to move their respective dogs 32 into engagement with the teeth of the ratchet wheels 11. As shown in Fig. 3, there is some lost motion provided for between the plate 37 and the arms 33, 34 of the rock shafts, and consequently the spring 42 will permit the arms 33, 34 to lag behind the plate 37 should either dog 32 encounter undue resistance in moving into engagement with the teeth of its ratchet wheel. Moreover, this arrangement permits either dog to move into operative position independently of the other. By this means danger of breakage is avoided and the proper functioning of the dumping connections at all times is insured.

As best shown in Figs. 3 and 6, the plate 37 is provided at its upper portion with a rearwardly projecting arm 54, preferably cast integral therewith, the upper surface of which arm is made angular in contour to provide two surfaces 55, 56 at a pronounced angle to each other.

The surface 55 is approximately perpendicular to the surface of the plate 37, and is comparatively long, while the surface 56 lies at an angle of approximately seventy degrees to the surface of the plate 55 and is considerably shorter. As shown in Fig. 3, the surface 56 extends downward from the surface 55 and is provided at its lower margin with a curved lip 57. A bracket 58 is secured to the horizontal flange 16 of the rake head and rises therefrom opposite the arm 54, said bracket being curved and recessed at its forward side, as shown at 59 in Fig. 3, to receive the rear end portion of the arm 54 when the parts are in operating position, as shown in Fig. 1. The bracket 58 carries a plunger 60 mounted in a yoke 61 in which is fitted a spring 62 that surrounds the plunger 60 and tends to force its lower end downward into engagement with one or the other of the surfaces 55, 56 of the arm 54. This plunger serves as a detent to normally hold the plate 37 against movement with respect to the bracket 58. The latter plate with its connections above described, and the bracket 58 and detent 60, constitute the greater part of the tripping mechanism by which the rake head is released from the ratchet wheels 11 upon the completion of the dumping operation. Such tripping mechanism also includes means by which the height to which the rake head is swung may be varied, this latter means comprising a stop plate 63 that is mounted on the rear portion of the draft frame in position to intercept the outer marginal portion of the plate 37 when the rake head is swung to the limit of its dumping movement. The stop plate 63 is provided with a plurality, preferably three, of arms 64, 65, 66, that radiate from a central point 67, about which the plate 63 is adapted to be turned upon a pivot bolt 68, best shown in Figs. 5 and 7.

Each of the arms of the stop plate is provided near its outer end with an upwardly extending rib or other suitable projection, these several projections, which rise to different heights, being indicated respectively by 69, 70 and 71. By rotating the stop plate 63 about its pivot 68, either of said ribs may be brought into position to intercept the plate 37, which is the position occupied by the rib 69 in Fig. 5. To hold the stop plate 63 in its different positions of adjustment, and also to support said plate and the bolt 68, a bracket 72 is provided, this bracket being firmly secured to the rear bar 22 of the draft frame, as by bolts 73. It is provided with a flat upper surface 74 upon which the stop plate 63 rests, and in this upper surface is a recess adapted to receive one or another of several downwardly projecting lugs 75 carried by the several arms of said stop plate. When any given arm is in operative position with reference to the trip plate 37 its lug 75 will register with and lie in said recess, thereby holding the stop plate 63 against rotation. To adjust the stop plate to bring any desired arm into operative position it may be lifted slightly to release its lug 75, this being provided for by means of a spring 76 mounted on the bolt 68 and functioning to yieldingly hold the stop plate down upon the flat surface 74 of the bracket 72. As shown in Fig. 7, said spring is interposed between the head of said bolt and the lower surface of the flat portion 74. It will be evident that when the highest projection, which is the projection 69 in the illustrated arrangement, is in operative position with respect to the trip plate 37, such trip plate will be intercepted sooner than if either of the other lower projections should be in such operative position, so that by rotating the stop plate 63 the point at which the trip plate 37 will be intercepted to release the dump-mechanism and permit the rake head to return to its operating position may be varied.

While I have shown the stop plate as being provided with three arms carrying projections, any desired number of such projections may, of course, be provided.

The operation is as follows: When the rake head is in operating position the parts are as shown in Fig. 1, at which time the plunger or detent 60 bears on the elongated surface 55 on the trip plate 37, and the dogs 32 are in their inoperative position shown in Fig. 8. The carrying wheels may, therefore, rotate without affecting the position of the rake head and its teeth. When the load becomes heavy enough to make dumping desirable the operator presses forward on the foot lever 52, thereby thrusting the rod 50 rearwardly and rocking the trip plate 37 about the axis represented by the rock shafts 28, 29, this movement being in a clockwise direction as viewed in the drawings. This rocking of the trip plate effects the rocking of the rock shafts 28, 29 in the same direction through the action of the spring 42 and cross-bar 40, thereby moving the dogs 32 into engagement with the ratchet teeth 14 of both carrying wheels. Until the latter operation takes place the rake head is not affected, and the movement of the trip plate with respect to the plunger 60 carries said plunger along the surface 55 to the surface 56, which it then engages, as shown in Figs. 2 and 3. The lip 57 at the rear end of the arm 54 prevents the plunger from slipping off the arm 54, and also limits the forward movement of the trip plate independently of the rake head. As soon as the dogs 32 engage the ratchet wheels 11, the forward movement of the machine carries the rock shafts 28, 29 around the axis of the carrying wheels, represented by the stub axles 18, and consequently causes the rake head to swing about the same axis to the position shown in Fig. 4, thereby elevating the teeth to clear the windrow.

As has been explained, Fig. 4 shows the parts in the position they occupy just before the limit of the dumping movement of the rake head is reached. At this point the trip plate 37 is intercepted by the projection 69 which prevents it from moving further, and, therefore, the continued movement of the rake head under the action of the ratchet mechanism swings the trip plate relatively in the opposite direction, thereby swinging the rock shafts in a reverse direction and carrying their dogs 32 out of engagement with the teeth of the ratchet wheels. This movement also carries the plunger 60 up the sharp incline 56 back to surface 55, where it functions to hold the dogs 32 out of operative position, the parts of the tripping mechanism being thus restored to their normal position. As soon as the rake head is released from the ratchet wheels 11, it drops back by gravity to its operating position.

It will be seen that by providing tripping mechanism comprising the trip plate 37 connected with the rock shafts, and the bracket 58 and plunger 60 carried by the rake head, the stoppage of the trip plate by its engagement with the projection 69, or with some equivalent part of the draft frame, or other form of stop, does not impart any appreciable shock to the rake head, as would be the case if a yielding connection between these parts were not provided, but through the action of the plunger 60 in connection with the steeply inclined surface 56 and more gently inclined surface 55, the releasing action is accomplished without shock such as would be liable to cause damage or disarrangement of the parts.

Where the load is heavy, or where the tripping is done while the machine is turning, at which time one dog and ratchet wheel carry most or all of the load, the releasing movement is harder, and, therefore, with the constructions heretofore employed a considerable jolt is caused when the trip plate strikes the stop, but my improved construction provides a cushioning device which to a large extent, if not altogether, eliminates such jolt. The surface 55 carried by the trip plate 37 is gently inclined to make operation of the trip plate by foot power easier, but the surface 56 may be inclined more sharply because the tripping is accomplished by the force of the draft and it is desirable to accomplish that operation as quickly as possible so that the rake head may at once return to its operating position to avoid leaving any surface unraked after dumping. During the dumping operation the spring 62 associated with the plunger 60, acting through said plunger and the trip plate 37, serves to hold the dogs 32 in operative engagement with their respective ratchet wheels, so that the operator does not need to keep his foot on the lever 52 for that purpose, and the trip plate may therefore be left free to accomplish the tripping operation without control by the operator.

It is to be understood that while I have described in detail the embodiment of my invention illustrated in the accompanying drawings, by so doing I have not intended to limit the claims hereinafter made to the particular construction shown and described, except in so far as claims may be directed expressly to such subject-matter, as my invention includes generically the subject-matter of the broader claims.

I claim:

1. In a dump rake comprising a rake head provided with rake teeth, carrying wheels, and a draft frame pivotally connected with the rake head, the combination with said elements, of dumping mechanism comprising ratchet wheels carried by and rotating with the carrying wheels, alined rock shafts journaled on the rake head and having means movable into operative engagement with the teeth of said ratchet wheels, respectively, by the rocking of said rock shafts, projections extending radially from said shafts, a tripping member pivotally mounted on said rock shafts and operable by the dumping movement of the rake head to directly engage the projections on said rock shafts to release the latter from said ratchet wheels at the end of such dumping movement, and means yieldingly connecting said tripping member with said rock shafts to permit limited rocking movement of said tripping member with respect to said rock shafts.

2. In a dump rake comprising a rake head provided with rake teeth, carrying wheels, and a draft frame pivotally connected with the rake head, the combination with said elements, of dumping mechanism comprising ratchet wheels carried by and rotating with the carrying wheels, alined rock shafts journaled on the rake head and having means movable into operative engagement with the teeth of said ratchet wheels, respectively, by the rocking of said rock shafts, a tripping member pivotally mounted on said rock shafts and operable by the dumping movement of the rake head to release said rock shafts from said ratchet wheels at the end of such dumping movement, and means yieldingly connecting said rock shaft directly with said tripping member to permit limited rocking movement of said rock shafts with respect to each other and to said tripping member.

3. In a dump rake comprising a rake head provided with rake teeth, carrying wheels, and a draft frame pivotally connected with the rake head, the combination with said elements, of dumping mechanism comprising ratchet wheels carried by and rotating with the carrying wheels, alined rock shafts journaled on the rake head and having means movable into operative engagement with the teeth of said ratchet wheels, respectively, by the rocking of said rock shafts, a tripping member operable by the dumping movement of the rake head to release said rock shafts from said ratchet wheels at the end of such dumping movement, and spring means directly carried by said tripping member and connected with said rock shafts to permit said rock shafts and said tripping member to rock to a limited extent with respect to each other.

4. In a dump rake comprising a rake head provided with rake teeth, carrying wheels, and a draft frame pivotally connected with the rake head, the combination with said elements, of dumping mechanism comprising ratchet wheels carried by and rotating with the carrying wheels, alined rock shafts journaled on the rake head and having means movable into operative engagement with the teeth of said ratchet wheels, respectively, by the rocking of said rock shafts, arms projecting radially from said shafts, a tripping member operable by the dumping movement of the rake head to release said rock shafts from said ratchet wheels at the end of such dumping movement, means mounted on said tripping member and yieldingly forcing said arms into engagement with said tripping member to permit limited rocking movement of said rock shafts with respect to each other and to said tripping member, a lever mounted on the draft frame, and a connection between said lever and said tripping member for rocking said tripping member by the operation of said lever.

5. In a dump rake comprising a rake head provided with rake teeth, carrying wheels, and a draft frame pivotally connected with the rake head, the combination with said elements, of dumping mechanism comprising ratchet wheels carried by and rotating with the carrying wheels, alined rock shafts journaled on the rake head and having means movable into operative engagement with the teeth of said ratchet wheels, respectively, by the rocking of said rock shafts, a tripping member pivotally mounted on said rock shaft and operable by the dumping movement of the rake head to release said rock shafts from said ratchet wheels at the end of such dumping movement, a spring carried by said tripping member and connected with said rock shafts to permit said rock shafts and said tripping member to rock to a limited extent with respect to each other, a lever mounted on the draft frame, and a connection between said lever and said tripping member for rocking said tripping member by the operation of said lever.

6. In a dump rake comprising a rake head provided with rake teeth, carrying wheels, and a draft frame pivotally connected with the rake head, the combination with said elements, of dumping mechanism comprising ratchet wheels carried by and rotating with the carrying wheels, alined rock shafts journaled on the rake head and having means movable into operative engagement with the teeth of said ratchet wheels, respectively, by the rocking of said rock shafts, a tripping member operable by the dumping movement of the rake head to release said rock shafts from said ratchet wheels at the end of such dumping movement, and yieldable means carried by said rake head and directly cooperating with said tripping member to permit limited movement of the latter with respect to said rake head.

7. In a dump rake comprising a rake head provided with rake teeth, carrying wheels, and a draft frame pivotally connected with the rake head, the combination with said elements, of dumping mechanism comprising ratchet wheels carried by and rotating with the carrying wheels, alined rock shafts journaled on the rake head and having means movable into operative engagement with the teeth of said ratchet wheels, respectively, by the rocking of said rock shafts, a tripping member pivotally carried by said rock shafts and operable by the dumping movement of the rake head to release said rock shafts from said ratchet wheels at the end of such dumping movement, means yieldingly connecting said rock shafts with said tripping member, a connection between the tripping member and the rake head comprising a spring actuated plunger carried by the rake head, and an arm carried by the tripping member having surfaces adapted to be engaged by said plunger, said surfaces being angularly disposed with respect to each other and to the tripping member.

8. In a dump rake comprising a rake head provided with rake teeth, carrying wheels, and a draft frame pivotally connected with the rake head, the combination with said elements, of dumping mechanism comprising ratchet wheels carried by and rotating with the carrying wheels, alined rock shafts journaled on the rake head and having means movable into operative engagement with the teeth of said ratchet wheels, respectively, by the rocking of said rock shafts, a tripping member operable by the dumping movement of the rake head to release said rock shafts from said ratchet wheels at the end of such dumping movement, and a connection between the tripping member and the rake head comprising a spring actuated plunger carried by the rake head, and an arm carried by the tripping member, said arm having an extended surface adapted to be engaged by said plunger when the tripping member is in its normal position, and an inclined surface at a pronounced angle to said first mentioned surface and adapted to be engaged by said plunger when said rock shafts have been rocked to operatively engage said ratchet wheels.

9. In a dump rake comprising a rake head provided with rake teeth, carrying wheels, means operable to dump the rake by rotation of said wheels, and tripping mechanism for such dumping means, the combination with said elements of means adapted to engage said tripping mechanism to actuate the same at the end of the dumping movement, said means being rotatably adjustable to vary the height to which the rake teeth are elevated in the dumping operation.

10. In a dump rake comprising a rake head provided with rake teeth, carrying wheels, and means operable to dump the rake by rotation of said wheels, a tripping member for such dumping means, and a draft frame pivotally connected with the rake head, the combination with said elements, of a stop pivotally carried by the draft frame adapted to be engaged by said tripping member, to actuate said tripping member at the end of the dumping movement of the rake head, said stop being adjustable by rotation thereof to vary the height to which the rake teeth are elevated in the dumping operation.

11. In a dump rake comprising a rake head provided with rake teeth, carrying wheels, and means operable to dump the rake by rotation of said wheels, a tripping member for such dumping means, and a draft frame pivotally connected with the rake head, the combination with said elements, of a stop mounted on the draft frame and adapted to be engaged by said tripping member to actuate said tripping member at the end of the dumping movement of the rake head, said stop having a series of elevations rising to different heights above the draft frame and being adjustable to position any one of such elevations to be engaged by and to actuate said tripping member.

12. In a dump rake comprising a rake head provided with rake teeth, carrying wheels, and means operable to dump the rake by rotation of said wheels, a tripping member for such dumping means, and a draft frame pivotally connected with the rake head, the combination with said elements, of a stop adapted to be engaged by said tripping member to actuate said tripping member at the end of the dumping movement of the rake head, said stop having a series of elevations rising to different heights above the draft frame, and being pivotally mounted upon the draft frame whereby it may be rotated to move any one of such elevations into position to be engaged by and to actuate said tripping member, and means for holding said stop in its different positions of adjustment.

WILBUR J. COULTAS.